United States Patent [19]

Kvamme et al.

[11] Patent Number: 5,394,272
[45] Date of Patent: Feb. 28, 1995

[54] HIGH-MAGNIFICATION WIDE-FIELD-OF-VIEW TELEMICROSCOPIC LENS CONFIGURATION

[75] Inventors: Damon F. Kvamme; Richard C. Kim, both of Ann Arbor, Mich.

[73] Assignee: General Scientific Corporation, Ann Arbor, Mich.

[21] Appl. No.: 93,839

[22] Filed: Jul. 19, 1993

[51] Int. Cl.$^6$ ............................................. G02B 13/00
[52] U.S. Cl. ................................... 359/744; 359/795
[58] Field of Search .............................. 359/744–748, 359/646–647, 661, 772–773, 795, 643, 656, 793, 362, 399, 481

[56] References Cited

U.S. PATENT DOCUMENTS

| | | | |
|---|---|---|---|
| 1,467,804 | 9/1923 | Merté | 359/748 |
| 2,390,387 | 12/1945 | Rayton et al. | 359/748 |
| 3,273,456 | 9/1966 | Feinbloom | 359/481 |
| 3,663,094 | 5/1972 | Bertle | 359/744 |
| 4,390,249 | 6/1983 | Rusinov et al. | 359/744 |
| 4,768,866 | 9/1988 | Wickholm et al. | 359/643 |

FOREIGN PATENT DOCUMENTS

| | | | |
|---|---|---|---|
| 1061091 | 7/1959 | Germany | 359/744 |
| 237421 | 2/1969 | U.S.S.R. | 359/744 |

*Primary Examiner*—Scott J. Sugarman
*Assistant Examiner*—James Phan
*Attorney, Agent, or Firm*—Gifford, Krass, Groh, Sprinkle, Patmore, Anderson & Citkowski

[57] ABSTRACT

A telemicroscopic lens configuration for high quality optical imaging applications which provides high magnification of a work area with a wide field of view. The telemicroscopic lens configuration is a Galilean-type configuration having a positive-power objective lens and a negative-power eyepiece lens separated by an air space. The focal length of the objective lens and the air space distance are optimized to provide the magnification and overall effective focal length of the instrument. The focal length of the eyepiece lens is chosen so that the object being magnified appears in front of the viewer. Different lens materials are selected to minimize polychromatic aberrations. The shape of the objective lens, including radius of curvature and thickness of each lens element, is optimized to minimize monochromatic aberrations, which principally include spherical aberration and coma. The shape of the eyepiece lens, in conjunction with the shape of the objective lens, helps to further reduce monochromatic aberrations and increase the depth of field.

7 Claims, 8 Drawing Sheets

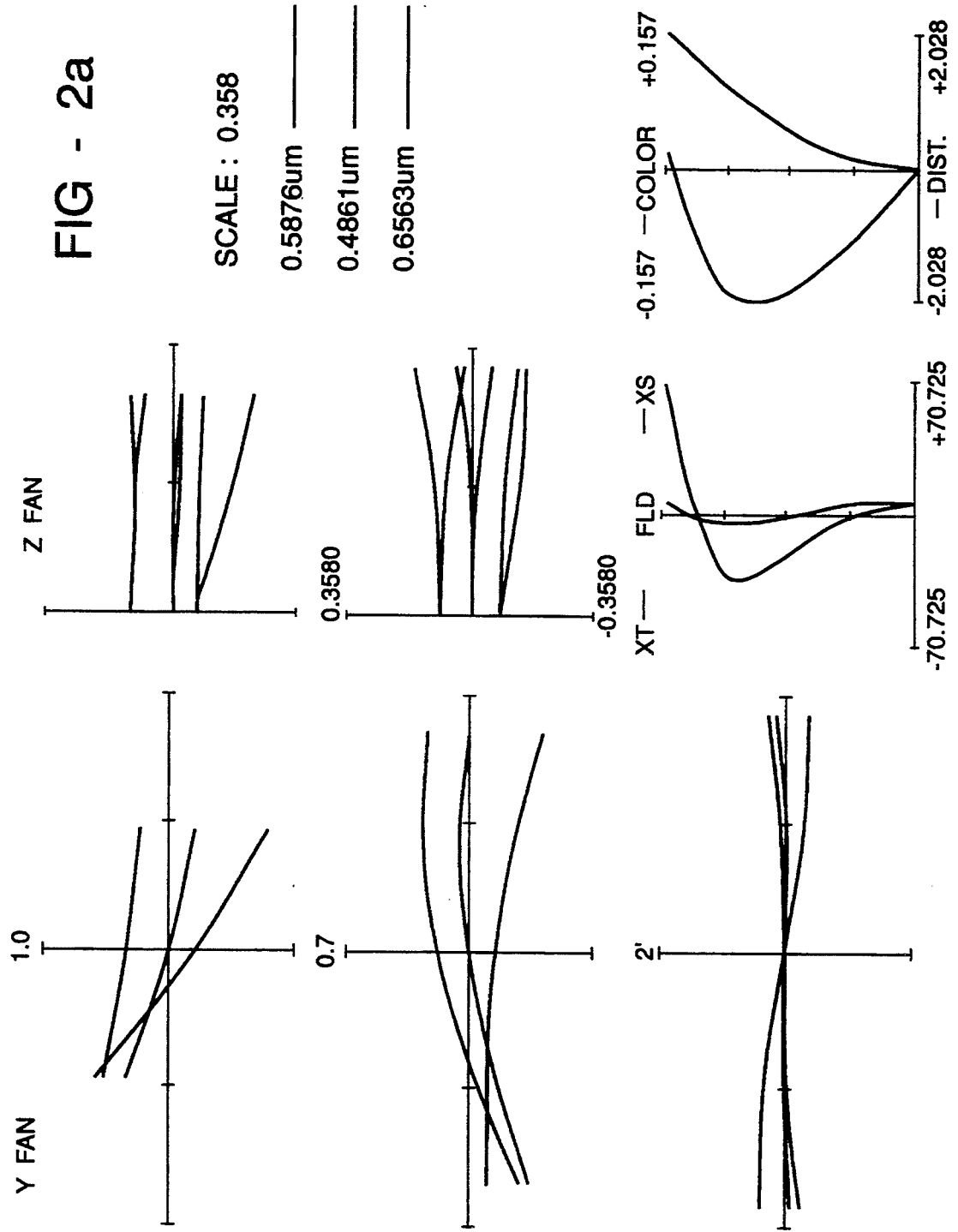

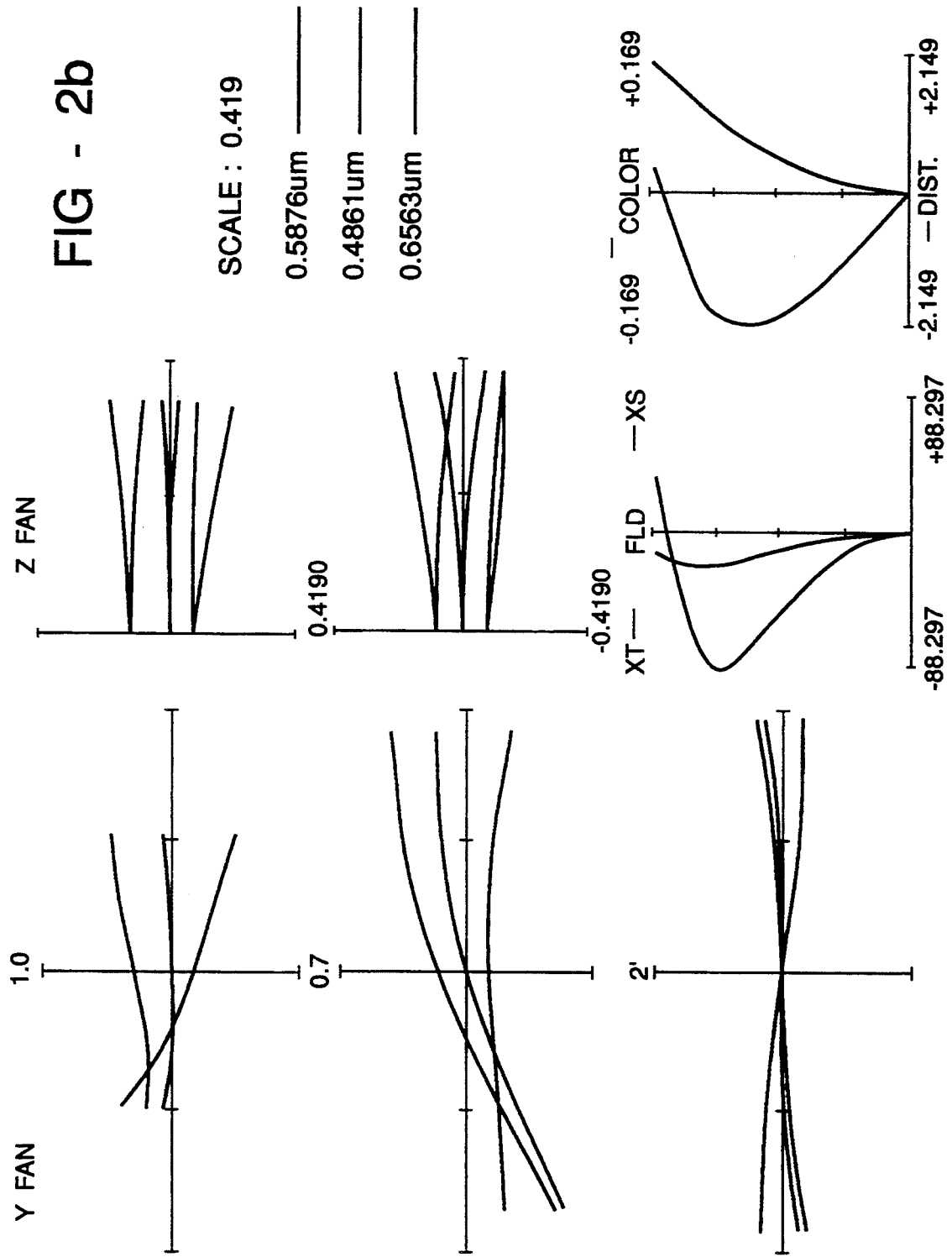

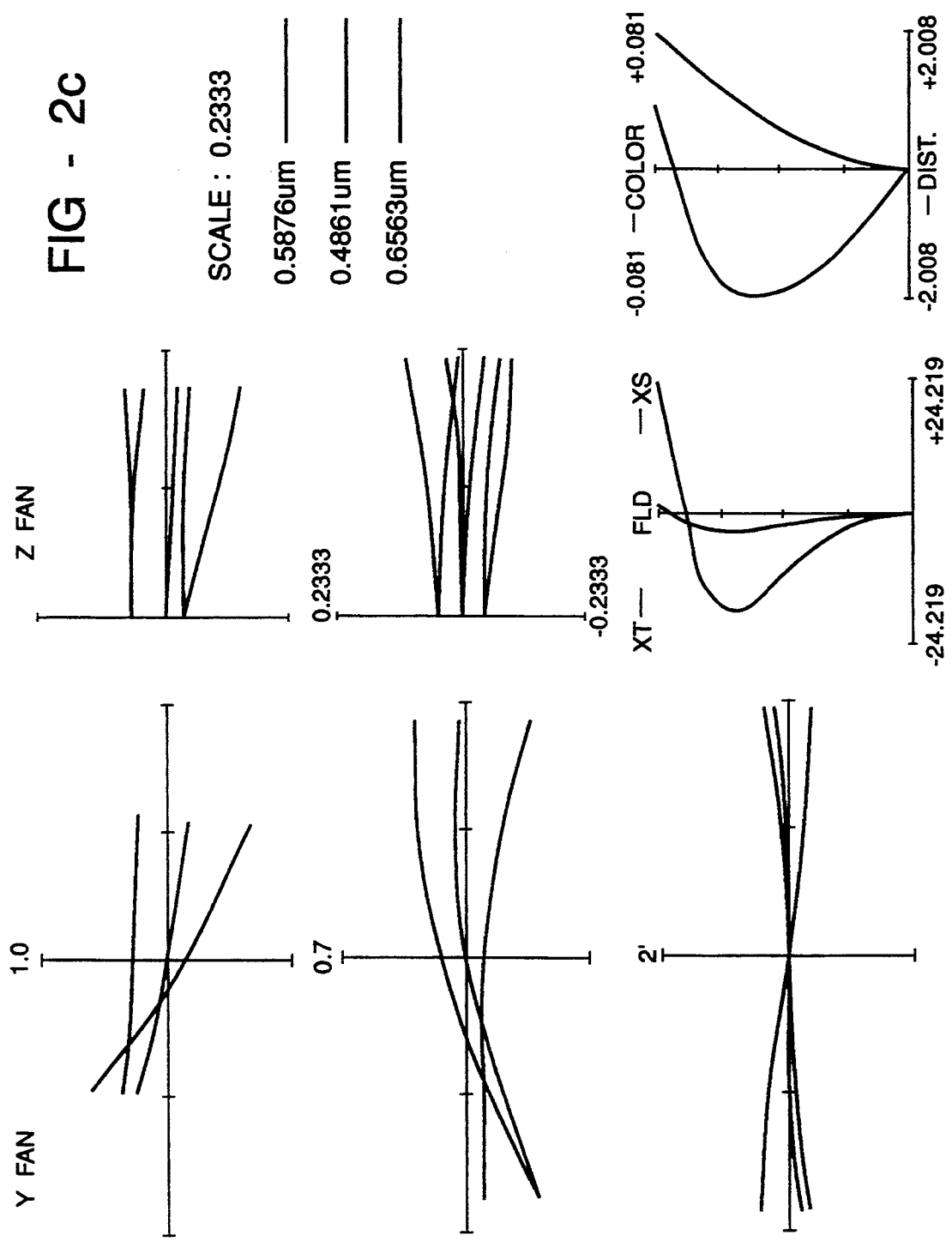

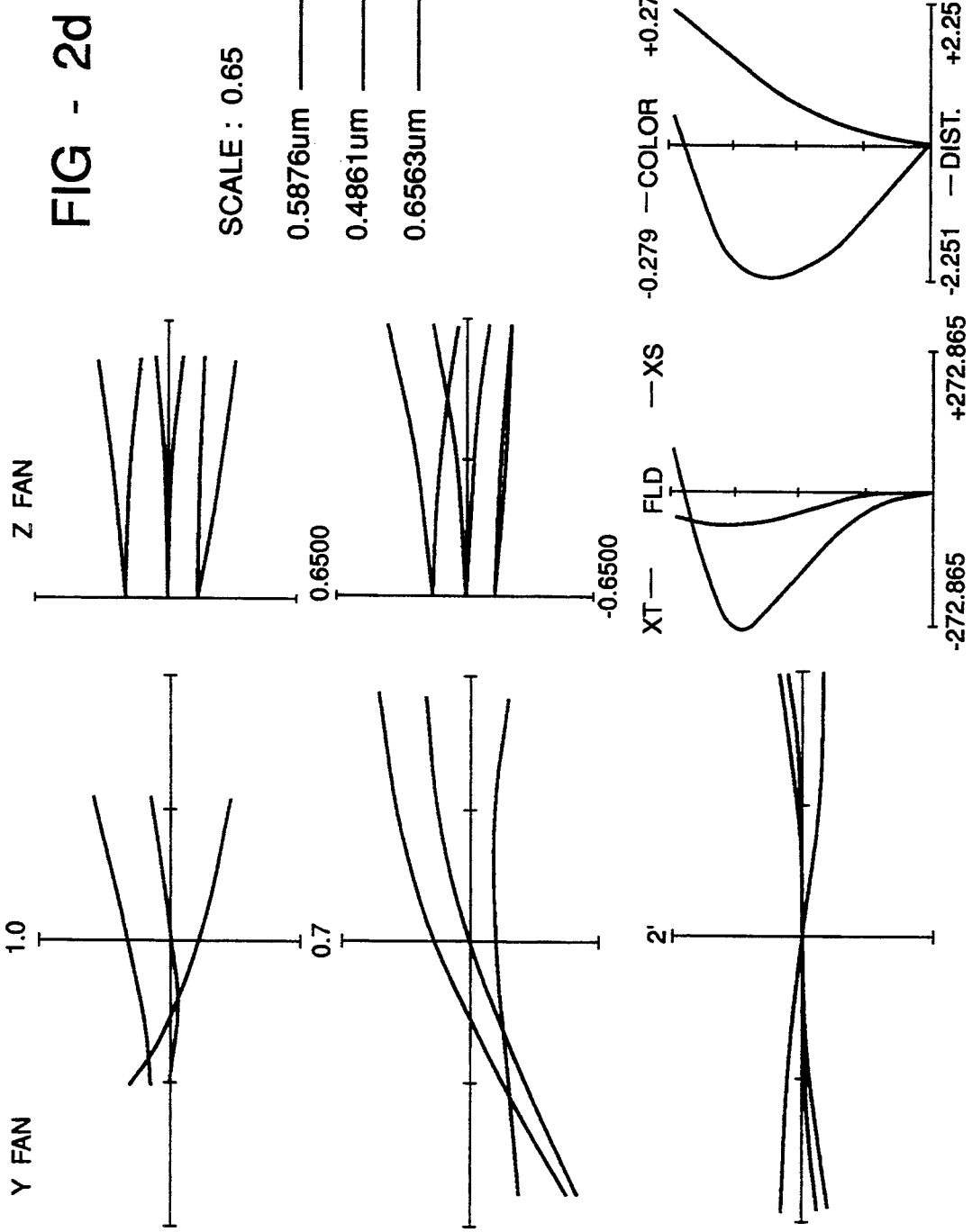

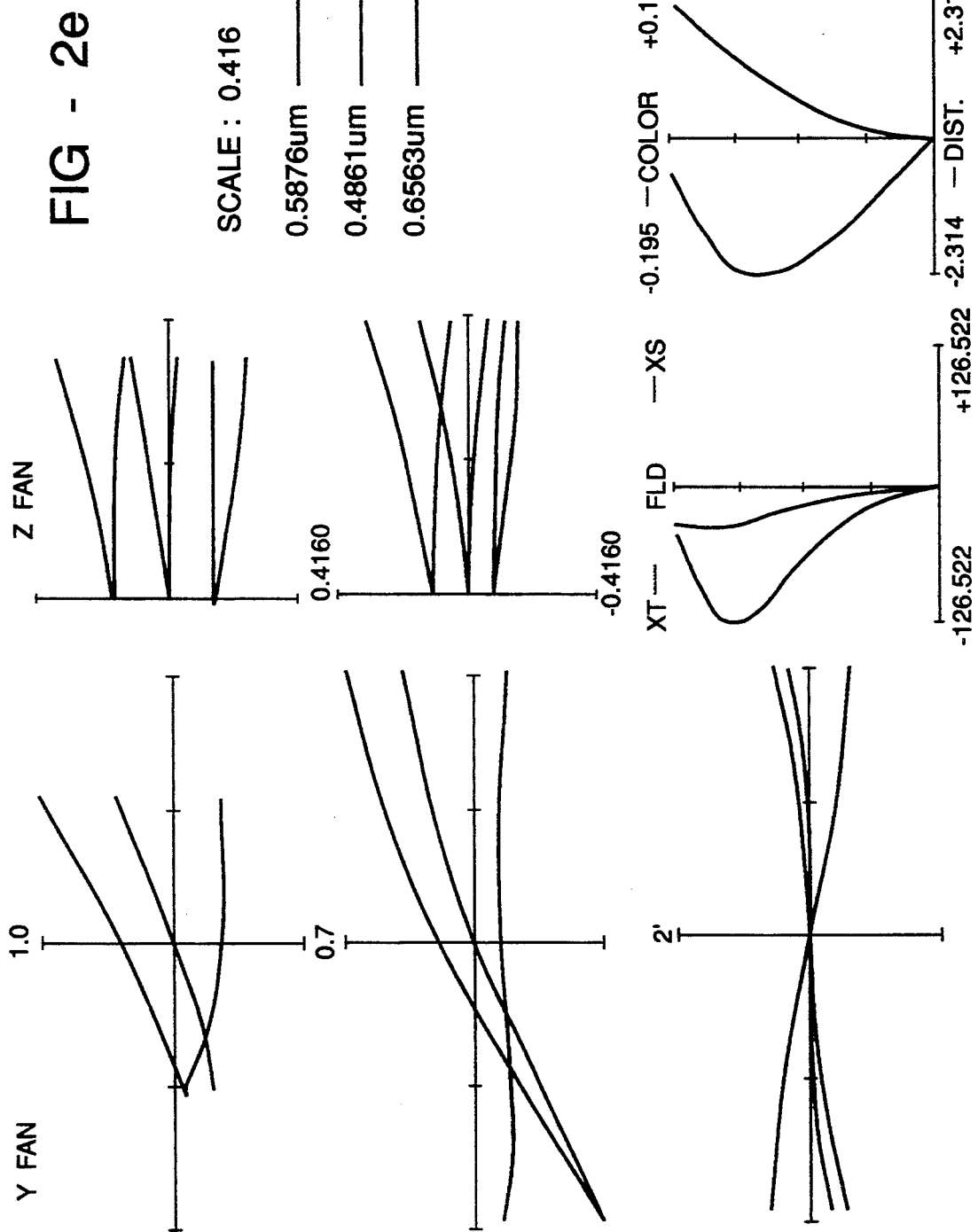

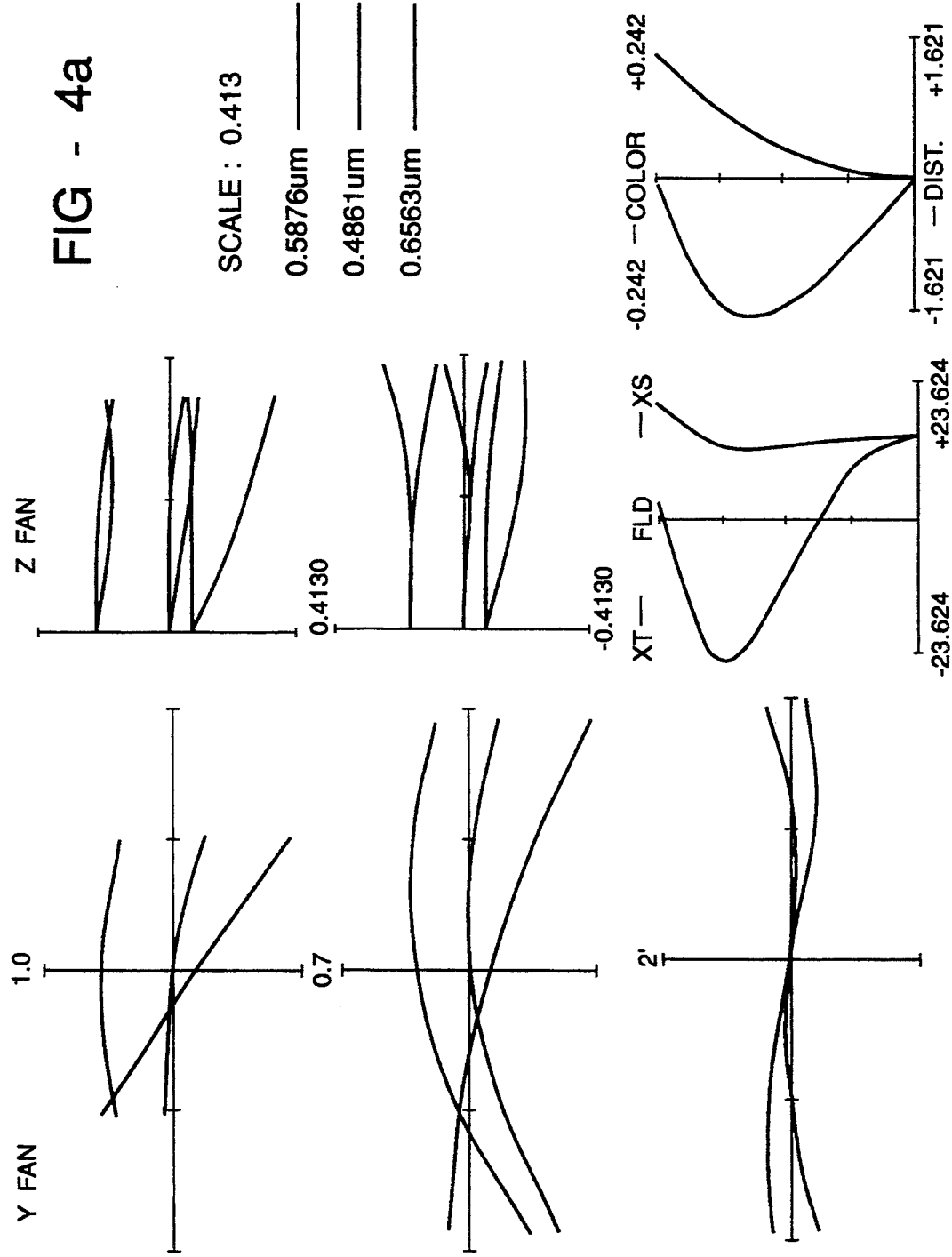

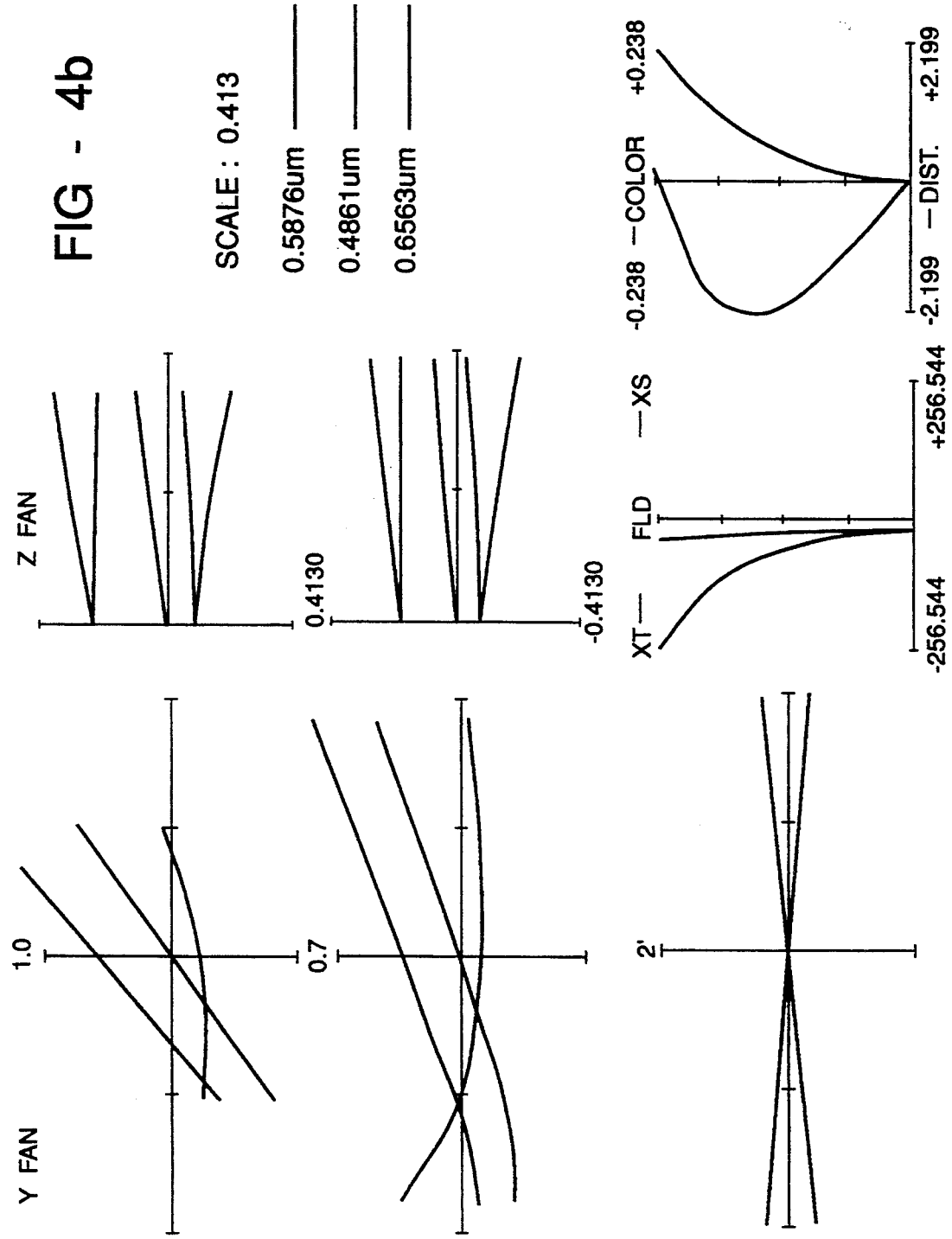

HIGH-MAGNIFICATION WIDE-FIELD-OF-VIEW TELEMICROSCOPIC LENS CONFIGURATION

BACKGROUND OF THE INVENTION

This invention relates generally to telemicroscopic instruments and, more particularly, to telemicroscopic lens configurations for high quality optical imaging applications.

Telemicroscopic instruments are widely used for magnifying a work area during precision work such as delicate surgery, dental work, inspection of circuit board solder joints, and assembly of miniature parts. A typical telemicroscopic instrument includes a pair of telemicroscopic loupes which are adjustably mounted to an eyeglass frame or head mount. The telemicroscopic loupes combine the long working distance of the telescope with the high quality magnification of the microscope. This type of optical instrument provides the user with a magnified image of the work area with a field of view at about arm's length. However, conventional lens configurations for these instruments are either very complex, which causes the instrument to be heavy and bulky, or they provide low magnification and a narrow field of view. Accordingly, there has been a need for a light and compact telemicroscopic lens configuration having high magnification with a wide field of view. The present invention clearly fulfills this need.

SUMMARY OF THE INVENTION

The present invention resides in a telemicroscopic-lens configuration for high quality optical imaging applications which provides high magnification of a work area with a wide field of view. The telemicroscopic lens configuration is a Galilean-type configuration having a positive-power objective lens and a negative-power eyepiece lens separated by an air space. The focal length of the objective lens and the air space distance are optimized to provide the magnification and overall effective focal length of the instrument. The focal length of the eyepiece lens is chosen so that the object being magnified appears in front of the viewer. Different lens materials are selected to minimize polychromatic aberrations. The shape of the objective lens, including radius of curvature and thickness of each lens element, is optimized to minimize monochromatic aberrations, which principally include spherical aberration and coma. The shape of the eyepiece lens, in conjunction with the shape of the objective lens, helps to further reduce monochromatic aberrations and increase the depth of field.

A first preferred embodiment of the present invention, for lower power magnification applications, includes a doublet objective lens and a singlet eyepiece lens. The objective lens includes a positive-power double-convex crown glass lens which is cemented to a negative-power meniscus flint lens. The eyepiece lens is a single nonsymmetric double-concave negative lens.

A second preferred embodiment of the present invention, for higher power magnification applications, includes a doublet objective lens and a doublet eyepiece lens. The objective lens includes a positive-power double-convex high-refractive-index crown glass lens which is cemented to a negative-power double-concave high-refractive-index flint lens. The eyepiece lens is a positive-power meniscus flint lens which is cemented to a negative-power double-concave or concave-convex high-refractive-index crown glass lens. The doublet eyepiece lens is useful for control of the axial spot size at the various wavelengths and the lateral color separation at the edge of the field of view.

It will be appreciated from the foregoing that the present invention represents a significant advance in the field of telemicroscopic instruments. Other features and advantages of the present invention will become apparent from the following more detailed description, taken in conjunction with the accompanying drawings, which illustrate, by way of example, the principles of the invention.

BRIEF DESCRIPTION OF THE DRAWINGS

FIGS. 2a–2e are graphs of the performance characteristics for several examples of the first preferred embodiment of the present invention;

FIGS. 4a–4b are graphs of the performance characteristics for several examples of the second preferred embodiment of the present invention.

DETAILED DESCRIPTION OF THE PREFERRED EMBODIMENTS

Figure 1:
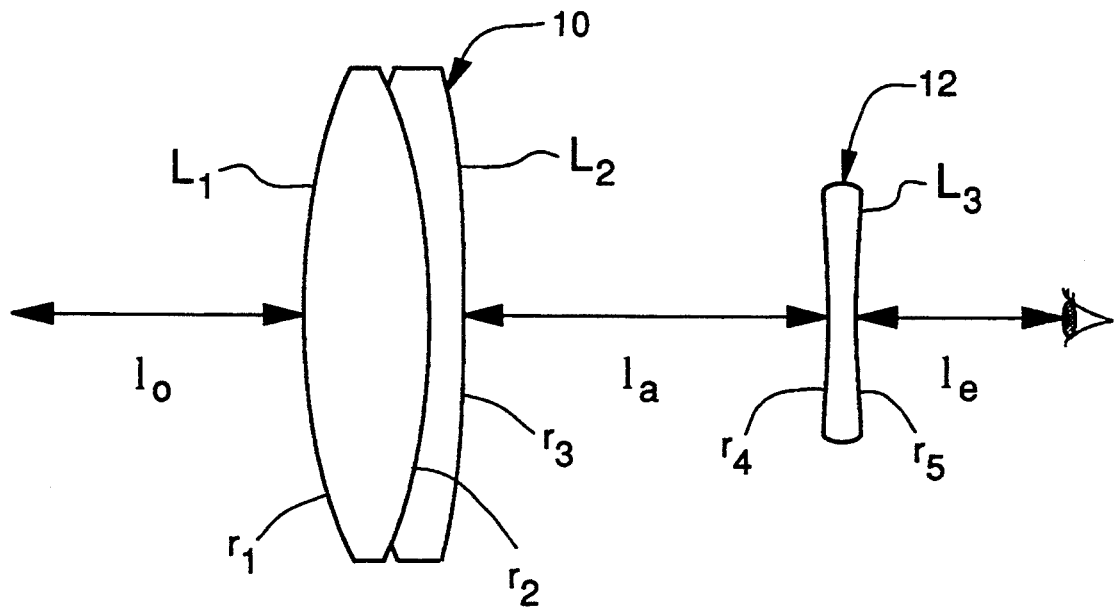
FIG. 1 is a schematic view of a first preferred embodiment of a telemicroscopic lens configuration in accordance with the present invention.

As shown in the drawings for purposes of illustration, the present invention is embodied in a telemicroscopic lens configuration for high quality optical imaging applications which provides high magnification of a work area with a wide field of view. The telemicroscopic lens configuration is a Galilean-type configuration having a positive-power objective lens and a negative-power eyepiece lens separated by an air space. The focal length of the objective lens and the air space distance are optimized to provide the magnification and overall effective focal length of the instrument. The focal length of the eyepiece lens is chosen so that the object being magnified appears in front of the viewer. Different lens materials are selected to minimize polychromatic aberrations. The shape of the objective lens, including radius of curvature and thickness of each lens element, is optimized to minimize monochromatic aberrations, which principally include spherical aberration and coma. The shape of the eyepiece lens, in conjunction with the shape of the objective lens, helps to further reduce monochromatic aberrations and increase the depth of field.

As shown in FIG. 1, a first preferred embodiment of the present invention, for lower power magnification applications, includes a doublet objective lens 10 and a singlet eyepiece lens 12. The objective lens 10 includes a positive-power double-convex crown glass lens $L_1$ which is cemented to a negative-power meniscus flint lens $L_2$. The eyepiece lens 12 is a single nonsymmetric double-concave negative-power lens $L_3$.

In a first example of this preferred embodiment, the radii $r_1$, $r_2$, $r_3$, $r_4$ and $r_5$ of the three lenses $L_1$, $L_2$ and $L_3$, their thicknesses $t_1$, $t_2$ and $t_3$, their refractive indexes $n_1$, $n_2$ and $n_3$, their dispersion values $v_1$, $v_2$ and $v_3$, the air space distance $l_a$ between the objective lens 10 and the eyepiece lens 12, the effective focal length $l_f$, the range of working distances $l_o$, the linear field of view $d_o$, and the magnification M are:

| | | |
|---|---|---|
| $r_1 = 40.7$ mm | $t_1 = 6.2$ mm | $l_a = 22.4$ mm |
| $r_2 = -40.7$ mm | $t_2 = 1.8$ mm | $l_f = 300$ mm |
| $r_3 = -116.3$ mm | $t_3 = 1.1$ mm | $M = 2.02$ |
| $r_4 = -62.6$ mm | $l_o = 240$ to $462$ mm | |
| $r_5 = 44.8$ mm | $d_o = 104$ to $176$ mm | |
| $n_1 = 1.517$ | $v_1 = 64.2$ | |
| $n_2 = 1.626$ | $v_2 = 35.7$ | |
| $n_3 = 1.522$ | $v_3 = 59.5$. | |

The nominal eye relief distance $l_e$ is 12.5 mm, but this distance can be varied from 6.5 mm to 25 mm to provide good performance for use with or without eyeglasses. The eye entrance pupil diameter $d_p$ is set at 5.1 mm. In this first example, the flatter radius of the eyepiece lens 12 faces the objective lens 10.

FIG. 2a shows the performance characteristics of the first example at a nominal working distance $l_o$ of 343 mm (13.5"). As shown, the lens configuration provides excellent image aberration characteristics over the entire field of view with well corrected color and distortion for a total spot size less than 2 arc minutes. The graphs are scaled to show the calibrated features of the performance characteristics.

In a second example of the first preferred embodiment, the radius $r_5$ of the eyepiece lens $L_3$ is 40.0 mm which provides an increased range of working distances $l_o$ of 286 to 628 mm with a linear field of view $d_o$ of 120 to 230 mm. The effective focal length $l_f$ for this example is 398 mm and the magnification M is 1.94. Varying the radius $r_5$ of the eyepiece lens provides a different range of working distances without requiring a change in the lens mounting assembly.

FIG. 2b shows the performance characteristics of the second example at a working distance $l_o$ of 457 mm (18"), FIG. 2c shows the performance characteristics of the second example at a working distance of 368 mm (14.5"), and FIG. 2d shows the performance characteristics of the second example at a working distance of 510 mm (20"). These figures show that the spot size and image integrity remain within the desired ranges for extended working distances, thus providing the viewer with a large depth of field.

In a third example of the first preferred embodiment, which provides an increase in magnification M to 2.8, the air space distance $l_a$ between the objective lens 10 and the eyepiece lens 12 is 29.9 mm, the radius $r_4$ of the eyepiece lens $L_3$ is 38.96 mm, the radius $r_5$ of lens $L_3$ is 77.33 mm, and the thickness $t_3$ of lens $L_3$ is 1.03 mm. The eyepiece lens material is changed to a refractive index $n_3$ of 1,583 and a dispersion value $v_3$ of 46.5 to compensate for additional aberrations caused by the increased magnification. The range of working distances $l_o$ for this design is 250 to 404 mm, the linear field of view $d_o$ is 77 to 106 mm, and the effective focal length $l_f$ is 229 mm. In this third example, the flatter radius of the eyepiece lens $L_3$ faces the eye. FIG. 2e shows the performance characteristics of the third example, showing that the spot size and image integrity remain within the desired ranges for this increased magnification.

In a fourth example of the first preferred embodiment, the radius $r_1$ of the eyepiece lens $L_3$ is 60.0 mm, which increases the range of working distances $l_o$ to 312 to 553 mm, the linear field of view $d_o$ to 88 to 136 mm, and the effective focal length $l_f$ to 300 mm. The magnification M of the configuration is reduced slightly to 2.6.

Figure 3:
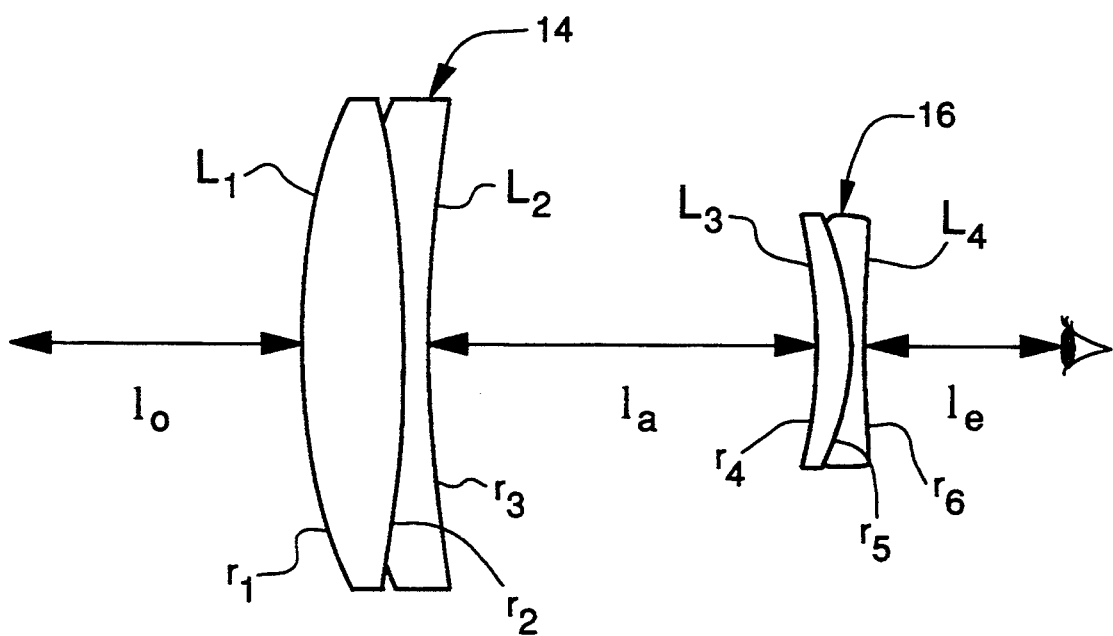
FIG. 3 is a schematic view of a second preferred embodiment of a telemicroscopic lens configuration in accordance with the present invention.

As shown in FIG. 3, a second preferred embodiment of the present invention, for higher power magnification applications, includes a doublet objective lens 14 and a doublet eyepiece lens 16. The objective lens 14 includes a positive-power double-convex high-refractive-index crown glass lens $L_1$ which is cemented to a negative-power double-concave high-refractive-index flint lens $L_5$. The eyepiece lens 16 is a positive-power meniscus flint lens $L_3$ which is cemented to a negative-power double-concave or concave-convex high-refractive-index crown glass lens $L_4$. The doublet eyepiece lens is useful for control of the axial spot size at the various wavelengths and the lateral color separation at the edge of the field of view.

In a first example of the second preferred embodiment, the radii $r_1$, $r_2$ $r_3$, $r_4$, $r_5$, and $r_6$ of the four lenses $L_1$, $L_2$, $L_3$, and $L_4$, their thicknesses $t_1$, $t_2$, $t_3$, and $t_4$, their refractive indexes $n_1$, $n_2$, $n_3$, and $n_4$, their dispersion values $V_1$, $V_2$, $V_3$, and $V_4$, the air space distance $l_a$ between the objective lens 14 and the eyepiece lens 16, the effective focal length $l_f$, the range of working distances $l_o$, the linear field of view $d_o$, and the magnification M are:

| | | |
|---|---|---|
| $r_1 = 34.9$ mm | $t_1 = 5.5$ mm | $l_a = 28.4$ mm |
| $r_2 = -80.7$ mm | $t_2 = 1.8$ mm | $l_f = 183$ mm |
| $r_3 = 306.0$ mm | $t_3 = 2.2$ mm | $M = 3.8$ |
| $r_4 = -43.7$ mm | $t_4 = 1.0$ mm | |
| $r_5 = -16.2$ mm | $l_0 = 252$ to $362$ mm | |
| $r_6 = 107.9$ mm | $d_0 = 68$ to $86$ mm | |
| $n_1 = 1.713$ | $V_1 = 53.8$ | |
| $n_2 = 1.785$ | $V_2 = 25.8$ | |
| $n_3 = 1.575$ | $V_3 = 41.5$ | |
| $n_4 = 1.713$ | $V_4 = 53.8$. | |

FIG. 4a shows the performance characteristics of this first example.

In second and third examples of the second preferred embodiment, which provides increased working distances, the radius $r_6$ of the eyepiece lens $L_4$ is 82.0 mm in the second example and 71.5 mm in the third example. The range of working distances $l_o$ of the second example is increased to 297 to 445 mm, the linear field of view $d_o$ is increased to 76 to 100 mm, and the effective focal length $l_f$ is increased to 216 mm. The magnification M is reduced slightly to 3.5. The range of working distances $l_o$ of the third example is increased to 331 to 512 mm, the linear field of view $d_o$ is increased to 82 to 110 mm, and the effective focal length $l_f$ is increased to 243 mm. The magnification M is reduced to 3.4.

In a fourth example of the second preferred embodiment, the air space distance $l_a$ between the objective lens 14 and the eyepiece lens 16 is increased to 32.0 mm to provide even higher magnification. The radius $r_4$ of the eyepiece lens $L_3$ is $-25.8$ mm, the radius $r_5$ of eyepiece lens $L_3$ and $l_4$ is $-14.2$ mm, the radius $r_6$ of lens $L_4$ is changed to $-586.2$ mm and made convex, and the thickness $t_4$ of lens $L_4$ is 1.1 mm. The range of working distances $l_o$ of the fourth example is 259 to 351 mm, the linear field of view $d_o$ is 56 to 68 mm, the effective focal length $l_f$ is 163 mm, and the magnification M is 5.4. FIG. 4b shows the performance characteristics of the fourth example at a nominal working distance $l_o$ of 380 mm (15").

In fifth and sixth examples of the second preferred embodiment, which provide increased ranges of working distances, the radius $r_6$ of the eyepiece lens $L_4$ is changed to 575 mm in the fifth example and changed to 210 mm in the sixth example. The range of working distances $l_o$ of the fifth example is increased to 306 to 427 mm, the linear field of view $d_o$ is increased to 62 to 76 mm, and the effective focal length $l_f$ is increased to 189 mm. The magnification M is reduced slightly to 4.9. The range of working distances $l_o$ of the sixth example is increased to 358 to 516 mm, the linear field of view $d_o$ is increased to 70 to 88 mm, and the effective focal length $l_f$ is increased to 220 mm. The magnification M is reduced to 4.5.

From the foregoing, it will be appreciated that the present invention represents a significant advance in the field of telemicroscopic instruments. Although several preferred embodiments of the invention have been shown and described, it will be apparent that other adaptations and modifications can be made without departing from the spirit and scope of the invention. Accordingly, the invention is not to be limited, except as by the following claims.

We claim:

1. A telemicroscopic lens configuration, comprising:
   a doublet objective lens including a positive-power double-convex high-refractive-index crown glass lens having a refractive index $n_1 = 1.713$, and a dispersion value $v_1 = 53.8$ cemented to a negative-power double-concave high-refractive-index flint lens having a refractive index $n_2 = 1.785$ and a dispersion value $v_2 = 25.8$; and
   a doublet eyepiece lens including a positive-power meniscus flint lens having a refractive index $n_3 = 1.575$ and a dispersion value $v_4 = 41.5$ cemented to a negative-power high-refractive-index crown glass lens having a refractive index $n = 1.713$ and a dispersion value $v_4 = 53.8$.

2. The telemicroscopic lens configuration as set forth in claim 1, wherein said positive-power crown glass lens has a radius $r_1 = 34.9$ mm and $r_2 = -80.7$ mm, and a thickness $t_1 = 5.5$ mm, said double-concave flint lens has a radius $r_2 = -80.7$ mm and $r_3 = 306.0$ mm and a thickness $t_2 = 1.8$ mm, said meniscus flint lens has a radius $r_4 = -43.7$ mm and a thickness $t_3 = 2.2$ mm, and said negative-power crown glass lens has a radius $r_5 = -16.2$ mm and $r_6 = 107.9$ mm, and a thickness $t_4 = 1.0$ mm, the air space distance $l_a$ between the objective lens and the eyepiece lens is approximately $l_a = 28.4$ mm, which provides an effective focal length $l_f$, a range of working distances $l_o$, a linear field of view $d_o$, and a magnification M of:

| | |
|---|---|
| $l_f$ = 183 mm | $l_o$ = 252 to 352 mm |
| M = 3.8 mm | $d_o$ = 68 to 86 mm. |

3. The telemicroscopic lens configuration as set forth in claim 2, wherein the radius $r_6$ of the eyepiece lens is approximately 82.0 mm, which provides a range of working distances $l_o$ of 297 to 445 mm, a linear field of view $d_o$ of 76 to 100 mm, an effective focal length $l_f$ of 216 mm, and a magnification of 3.5.

4. The telemicroscopic lens configuration as set forth in claim 2, wherein the radius $r_6$ of the eyepiece lens is approximately 71.5 mm, which provides a range of working distances $l_o$ to 331 of 512 mm, a linear field of view $d_o$ of 82 to 110 mm, an effective focal length $l_f$ of 243 mm, and a magnification M of 3.4.

5. The telemicroscopic lens configuration as set forth in claim 2, wherein the air space distance $l_a$ between the objective lens and the eyepiece lens is approximately 32.0 mm, the radius $r_4$ of the eyepiece lens is approximately $-25.8$ mm, the radius $r_5$ of the eyepiece lens is approximately $-14.2$ mm, the radius $r_6$ of the eyepiece lens is approximately $-586.2$ mm, and the thickness $t_4$ of the eyepiece lens is approximately 1.1 mm, which provides a range of working distances $l_o$ of 259 to 351 mm, a linear field of view $d_o$ of 56 to 68 mm, an effective focal length $l_f$ of 163 mm, and a magnification M of 5.4.

6. The telemicroscopic lens configuration as set forth in claim 5, wherein the radius $r_6$ of the eyepiece lens is approximately 575 mm, which provides a range of working distances $l_o$ of 306 to 427 mm, a linear field of view $d_o$ of 62 to 76 mm, an effective focal length $l_f$ to 189 mm, and a magnification M of 4.9.

7. The telemicroscopic lens configuration as set forth in claim 5, wherein the radius $r_6$ of the eyepiece lens is approximately 210 mm, which provides a range of working distances $l_o$ of 358 to 516 mm, a linear field of view $d_o$ of 70 to 88 mm, an effective focal length $l_f$ of 220 mm, and a magnification M of 4.5.

* * * * *

UNITED STATES PATENT AND TRADEMARK OFFICE
CERTIFICATE OF CORRECTION

PATENT NO. : 5,394,272  
DATED : February 28, 1995  
INVENTOR(S) : Kvamme, Damon F.; Kim, Richard C.

It is certified that error appears in the above-indentified patent and that said Letters Patent is hereby corrected as shown below:

Column 3, line 28: Replace "$1_f$for" with --$1_f$ for--.

Column 3, line 50: Replace "1,583" with --1.583--.

Column 3, line 54: Replace "$1_f$is" with --$1_f$ is--.

Column 3, line 61: Replace "$r_1$" with --$r_5$--.

Column 3, line 64: Replace "$1_f$to" with --$1_f$ to--.

Column 4, line 5: Replace "$L_5$" with --$L_2$--.

Column 4, line 42: Replace "$1_f$is" with --$1_f$ is--.

Column 4, line 46: Replace "$1_t$" with --$1_f$--.

Column 4, line 53: Replace "$1_4$" with --$L_4$--.

Column 4, line 58: Replace "$1_f$is" with --$1_f$ is--.

Column 5, line 1: Replace "$1_f$is" with --$1_f$ is--.

UNITED STATES PATENT AND TRADEMARK OFFICE
CERTIFICATE OF CORRECTION

PATENT NO. : 5,394,272
DATED : February 28, 1995
INVENTOR(S) : Kvamme, Damon F.; Kim, Richard C.

It is certified that error appears in the above-indentified patent and that said Letters Patent is hereby corrected as shown below:

Column 6, line 18: Replace "$1_f$of" with --$1_f$ of--.

Column 6, line 30: Replace "$1_f$of" with --$1_f$ of--.

Signed and Sealed this

Twenty-fifth Day of July, 1995

Attest:

BRUCE LEHMAN

*Attesting Officer*     *Commissioner of Patents and Trademarks*